United States Patent [19]

Mahoney et al.

[11] Patent Number: 5,154,000
[45] Date of Patent: Oct. 13, 1992

[54] CONDUIT BENDING PLANE AND BEND ANGLE INDICATOR

[76] Inventors: Paul R. Mahoney, 416-½ South Villa Ave., Villa Park, Ill. 60181; John E. Walsh, 17 Midway St., Norfolk, Mass. 02056

[21] Appl. No.: 817,586

[22] Filed: Jan. 7, 1992

[51] Int. Cl.[5] .................................................. G01C 9/00
[52] U.S. Cl. ......................................... 33/371; 33/343
[58] Field of Search ................... 33/343, 371, 373, 351

[56] References Cited

U.S. PATENT DOCUMENTS

| | | |
|---|---|---|
| 1,135,163 | 4/1915 | Denney . |
| 2,824,381 | 2/1958 | Traupmann . |
| 2,932,225 | 4/1960 | Gardner ............................ 33/371 X |
| 2,993,281 | 7/1961 | Dock . |
| 3,192,641 | 7/1965 | Jones . |
| 3,469,322 | 9/1969 | Eriksson . |
| 3,664,032 | 5/1972 | Tompkins . |
| 3,832,782 | 9/1974 | Johnson et al. . |
| 4,274,208 | 6/1981 | Yakkel .............................. 33/371 |
| 4,394,799 | 7/1983 | Moree ............................... 33/343 |
| 4,432,146 | 2/1984 | Klein ................................. 33/334 |
| 4,986,002 | 1/1991 | Oros et al. ......................... 33/354 |

FOREIGN PATENT DOCUMENTS 2157433 10/1985 United Kingdom .
2201911 9/1988 United Kingdom .

Primary Examiner—Harry N. Haroian
Attorney, Agent, or Firm—Willian Brinks Olds Hofer Gilson & Lione

[57] ABSTRACT

A conduit bending plane and bend angle indicator having a clamp mounting, an anti-dog bubble level to indicate the bend of plane, and an angle bubble level to indicate the bend angle. The invention further features a ratchet connection between the anti-dog bubble level and the clamp mounting to enable the anti-dog bubble level to be referenced at level without having to rotate the conduit to level. A second ratchet connection is also provided which allows the angle bubble level to be set plumb so as to accurately indicate the bend angle without having a first level the conduit along its longitudinal axis. Thus, the disclosed invention provides a quick and easy device to indicate the bending plane and bend angle of conduit being bent without requiring additional adjustments to the conduit once the device is mounted to it.

25 Claims, 6 Drawing Sheets

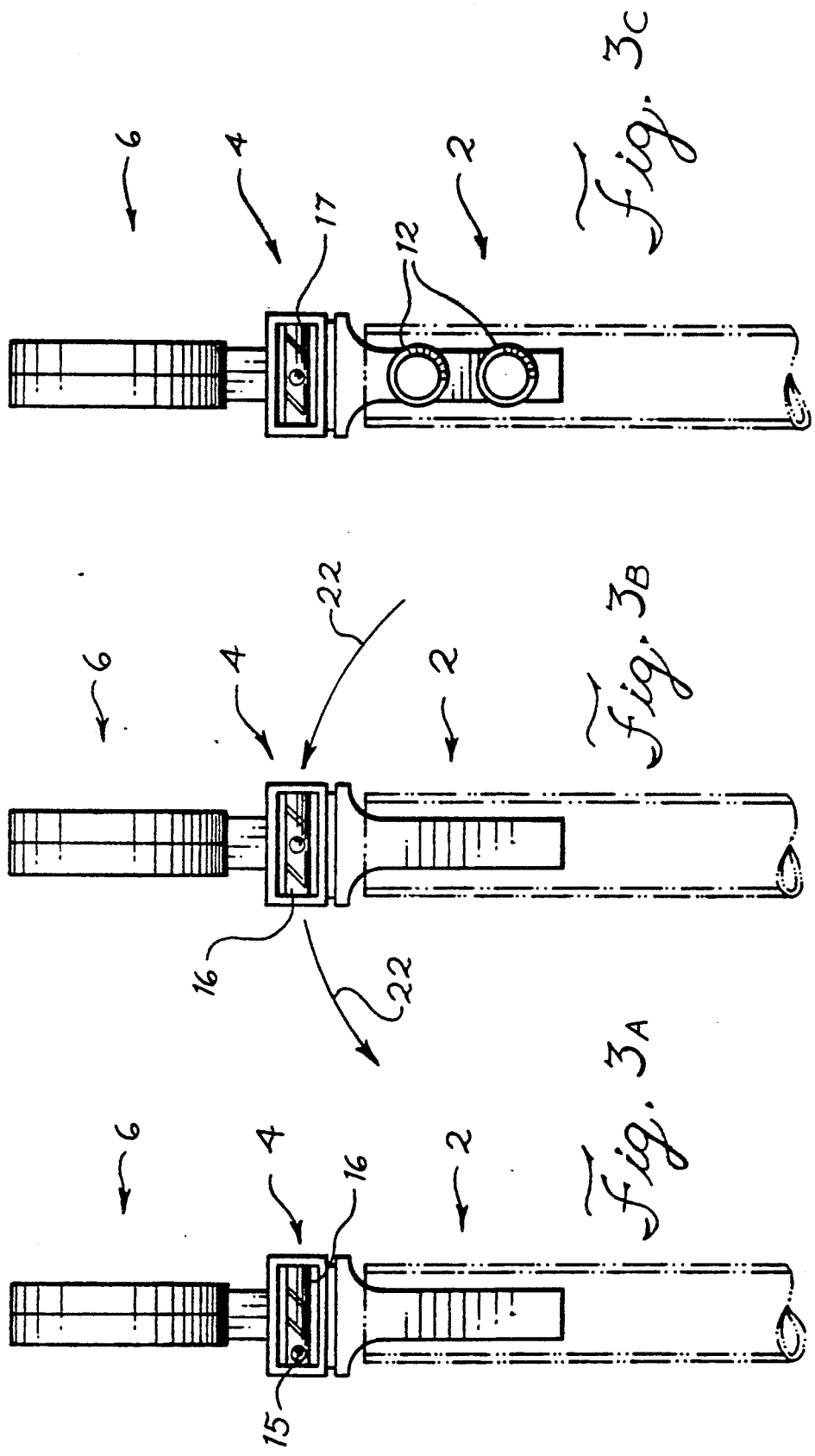

CONDUIT BENDING PLANE AND BEND ANGLE INDICATOR

BACKGROUND

The bending of conduit requires a way to insure that the bend is in the same plane as the rest of the conduit, i.e., does not form a dog-leg. Moreover, it is equally important to have a device which accurately measures the angle of the bend.

Previous devices have tried to provide these dual functions. For example, the patent to Yakkel, U.S. Pat. No. 4,274,208 discloses a precision bend level which contains a plane indicating level and angle indicating level. The plane indicating level, however, requires that it be attached to the conduit and then the conduit be rotated in the bending machine so as to reference the bending plane to level. Furthermore, the angle indicating level is not adjustable between multiple bend angles and is further not able to be referenced to a plumb position to compensate should the conduit itself or the bending machine not be level.

The patent to Morree, et al., U.S. Pat. No. 4,394,799 discloses a plane and angle indicating device. This device, however, also requires that it be attached to the conduit and then the conduit be rotated so as to reference the bending plane to level.

It is apparent, therefore, that no device has yet provided both a bending plane indicator and angle indicator, each of which may be set to a reference zero without adjusting the conduit or the bending machine. Moreover, no device has yet offered these functions while also being able to precisely measure any angle of bend.

SUMMARY OF THE INVENTION

The present invention relates in general to conduit bending, and specifically relates to a device which is attached to a section of conduit to be bent in either a mechanical or hydraulic bender. The invention performs two functions: first, provides an indication that the bend is within a reference plane and not forming a dog-leg and, second, indicates the degree of bend. The invention provides these two tasks without having to first level the conduit along its longitudinal axis to reliably indicate the bend of the conduit and also without having to level the conduit along its orthogonal horizontal axis to indicate whether any dog-leg will occur. Thus, the invention requires less steps to accurately bend conduit to any desired angle without forming a dog-leg. Moreover, the current device offers these two functions although it is quite small, easily capable of being carried in a pocket.

A first embodiment of the invention includes: (1) a mounting section which allows the device to be easily attached to an end of conduit; (2) an anti-dog section having a bubble level to indicate whether a dog is occurring as the conduit is bent; (3) first joint means connecting the anti-dog section to the mounting section and allowing the anti-dog section to be independently rotated above the longitudinal axis of the conduit so as to reference the anti-dog bubble level into a zero or level position without having to first adjust the conduit or the mounting section; (4) an angle indicating section having means for indicating the degree to which the conduit is bent; and (5) second joint means connecting the angle indicating section to the anti-dog section and allowing the angle indicating section to be independently rotated about the horizontal orthogonal axis of the conduit so as to reference the angle indicating section into a zero or level position without having to first adjust the conduit, mounting section, or anti-dog section.

Therefore, among the features and advantages of the invention is to provide a device which will simultaneously prevent dog-legs and indicate the angle of bend in a piece of conduit.

Another feature and advantage of the invention is to prevent dog-legs as a piece of conduit is bent and to indicate the angle of a bend without first requiring the conduit to be adjusted in the bender so as to reference to a level or plumb position either the anti-dog section or the angle indicating section respectively.

Another feature and advantage is to provide a device which may be used in both the right side up as well as upside down orientation, i.e., may be used while attached to any position on the pipe wall.

A still further feature and advantage is to provide a device which incorporates color coded angle markings to clearly indicate in which direction a bend should be made when creating an offset in a piece of conduit.

These and other features and advantages of the present invention will be more apparent by reference to the following description of a preferred embodiment of the present invention and by reference to the attached drawings.

BRIEF DESCRIPTION OF THE DRAWINGS

FIG. 3 is a top view showing the three stages of using the anti-dog feature of the device.

FIG. 4 is a perspective view of a piece of conduit and the device attached to it showing the various axes and planes referred to.

DETAILED DESCRIPTION OF THE INVENTION

Figure 1:
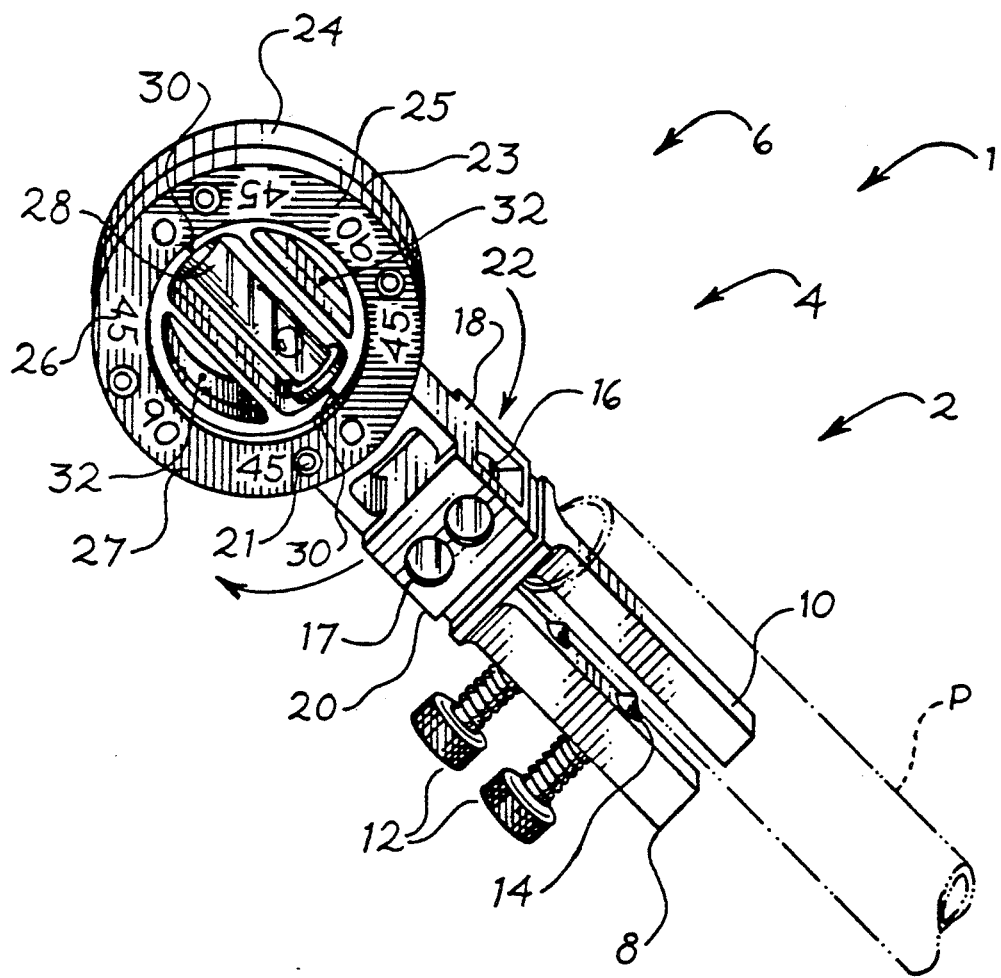
FIG. 1 is a perspective view of a presently preferred embodiment of the present invention shown attached to an end of a section of conduit.
Figure 2A:
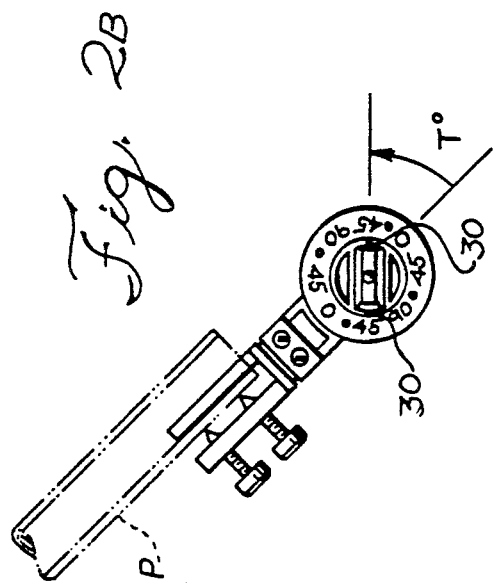
FIG. 2 is a side view showing the four stages of using the angle indicating feature of the device to make a bend in conduit without first leveling the conduit.
Figure 2C:
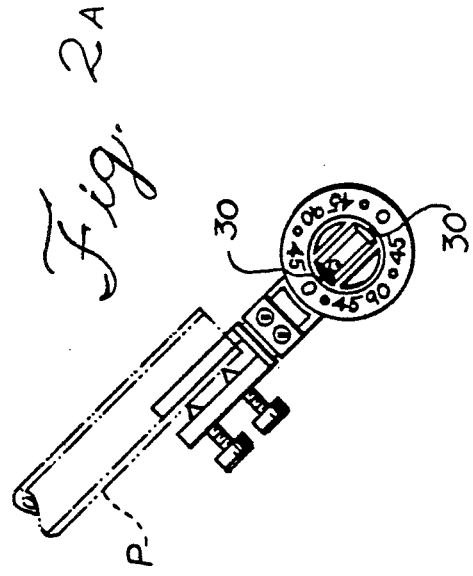
Figure 2D:
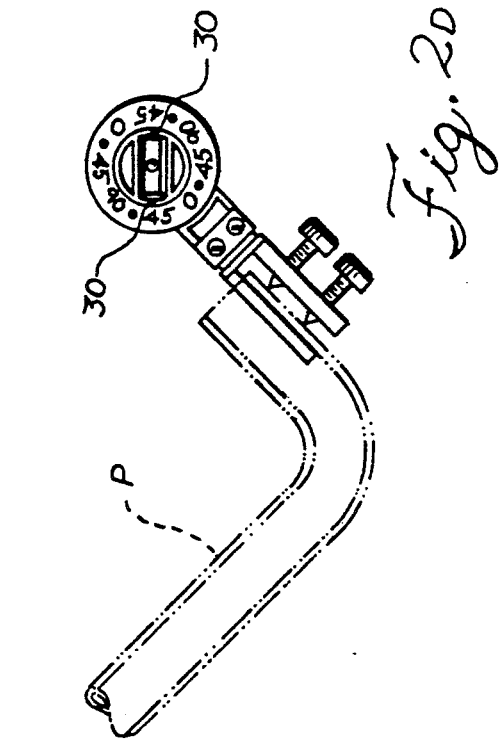
Figure 2B:
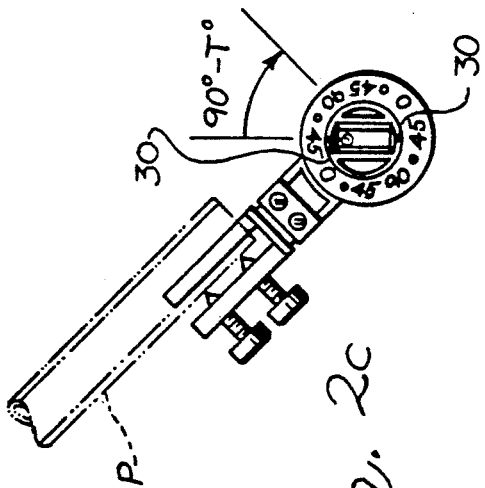

The conduit bending plane and bend angle indicator 1 is best shown in FIG. 1. The device has basically three sections: a mounting section 2, an anti-dog section 4, and an angle indicating section 6. The mounting section 2 functions to clamp the device to a wall of conduit or pipe P. The mounting section 2 has an attaching fork comprised of a front tine 8 and a spaced rear tine 10. A pair of thumb screws 12 are engaged in threaded apertures 14 in the front tine 8 to provide the necessary adjustable clamping force to mount the device to a section of conduit. The mounting section 2 is configured so that when the device is mounted to a section of conduit, the longitudinal axis of the device corresponds to the longitudinal axis of the conduit.

Attached to the mounting section 2 is the anti-dog section 4. The anti-dog section 4 contains means for indicating whether a dog is occurring in the conduit P. The preferred embodiment uses a series of anti-dog bubble levels 16 and 17. The first anti-dog bubble level 16 is mounted so as to be viewable from the upper side 18 and second anti-dog bubble level 17 is mounted so as to be viewable from the lower side 20 of the device. These bubble levels are further oriented horizontal and orthogonal to the longitudinal axis of device so as to indicate, as a bend is made, whether the bend is dogging or skewing out of plane to the left or right side of the longitudinal axis of the conduit.

Figure 4:
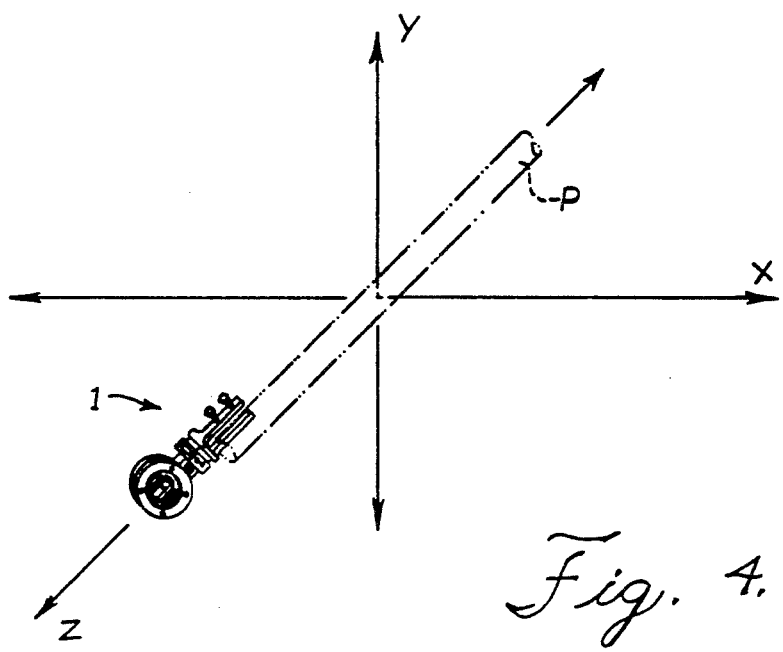

The axes referred to are shown in FIG. 4. The horizontal orthogonal axis is labelled X; the vertical orthogonal axis is labelled Y and the longitudinal axis is labelled Z.

Figure 6:
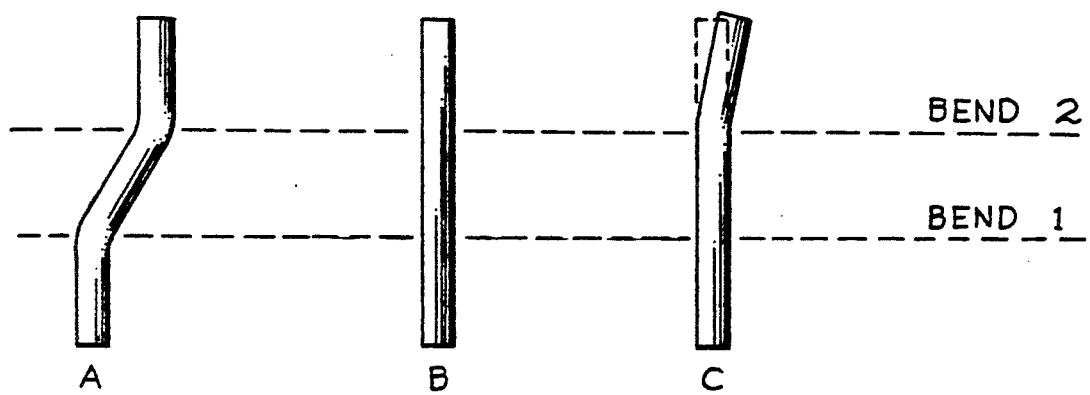
FIG. 6 is an illustration of a piece of conduit bent to an offset having a dog-leg and one not having a dog-leg.

A dogged bend is depicted in FIG. 6. FIG. 6A is a side view of a piece of conduit bent into an offset. FIG. 6B is a top view of a piece of conduit bent into an offset not having a dog-leg. FIG. 6C is a top view of a piece of conduit bent into an offset and having a dog-leg.

The anti-dog section 4 is mounted to the mounting section 2 to allow the anti-dog section to be rotated about the longitudinal axis of the conduit to which the device is attached. The rotation of the anti-dog section 4 is shown in FIG. 1 by the directional arrow 22. The anti-dog section 4 is mounted to permit it to be set at a level horizontal position without having to first level the conduit P or level the mounting section 2 of the device 1. Either bubble level 16 or 17 indicates when the anti-dog section is level. A ratchet system (not shown) is provided for achieving this rotation. Such a ratchet system has an index to it in suitably small increments so as to enable the anti-dog section to be precisely leveled. Such ratchet systems are well known in the art, as disclosed in the patent to Gardner U.S. Pat. No. 2,932,225. Of course, it is readily apparent that other means, besides such a ratchet system, may also be used for mounting the anti-dog section to the mounting section.

The anti-dog section 4 further features a mounting band 24 which provides a structure into which the angle indicating section 6 may be rotatably mounted. As seen in FIG. 1, the mounting band 24 longitudinally extends from the anti-dog section 4. The mounting band 24 further has upon it an embossed degree scale 26 to indicate the degree of bend of the conduit P. This degree scale 26 is in increments of 1° and has the most commonly used angles in larger print, e.g. 10°, 30°, 45°, 60°, etc. The degree scale 26 further features color coding, i.e. the upper half of the degree scale 26 is red on one side and the lower half is blue. The different color coding is depicted by the cross hatched lines 25 and 27. This color coding is also reversed between the two sides, i.e. on the opposite side the upper half is blue and the lower half is red. The color coding is most helpful when an offset is installed into a piece of conduit. An offset is comprised of two equal and opposite bends, both less than ninety degrees. A first bend takes off from the original conduit direction, usually to clear an obstruction. The second bend of the offset returns the conduit to its original direction, but on a new plane. The color-coded angle markings serve to alert the user that when the device is rolled 180°, such as is done to install the second bend of an offset, which degree scale to use and which direction to bend the conduit. As previously mentioned, an offset bend is depicted in FIG. 6A.

The angle indicating section 6 features means for indicating the angle of bend of the conduit P. The preferred embodiment uses an angle bubble level 28 having an indicating arrow 30. The angle indicating section 6 may be mounted within the mounting band 24 by the mounting ring 23 and mounting pins 21 to allow the angle indicating section 6 to be rotated about an axis horizontal and orthogonal to the conduit. This permits the angle indicating section 6 to be horizontally leveled without having to first horizontally level the length of conduit P along its longitudinal axis. A ratchet system (not shown) is provided to mount the angle indicating section 6 to the mounting band 24 so as to permit this rotation. Such a ratchet system may be the same as that used to join the mounting section 2 to the anti-dog section 4. Finger holes 32 are provided to permit grasping the angle indicating section 6 and rotating it to the desired position. The indicating arrow 30 is positioned so as to indicate the relative angle of the angle bubble level 28 to the mounting band 24. Thus, the degree of tilt along the longitudinal axis of the conduit P may be determined by rotating the angle bubble level 28 into a level position and noting the position of the indicating arrow 30 relative to the degree scale 26.

Figure 5:
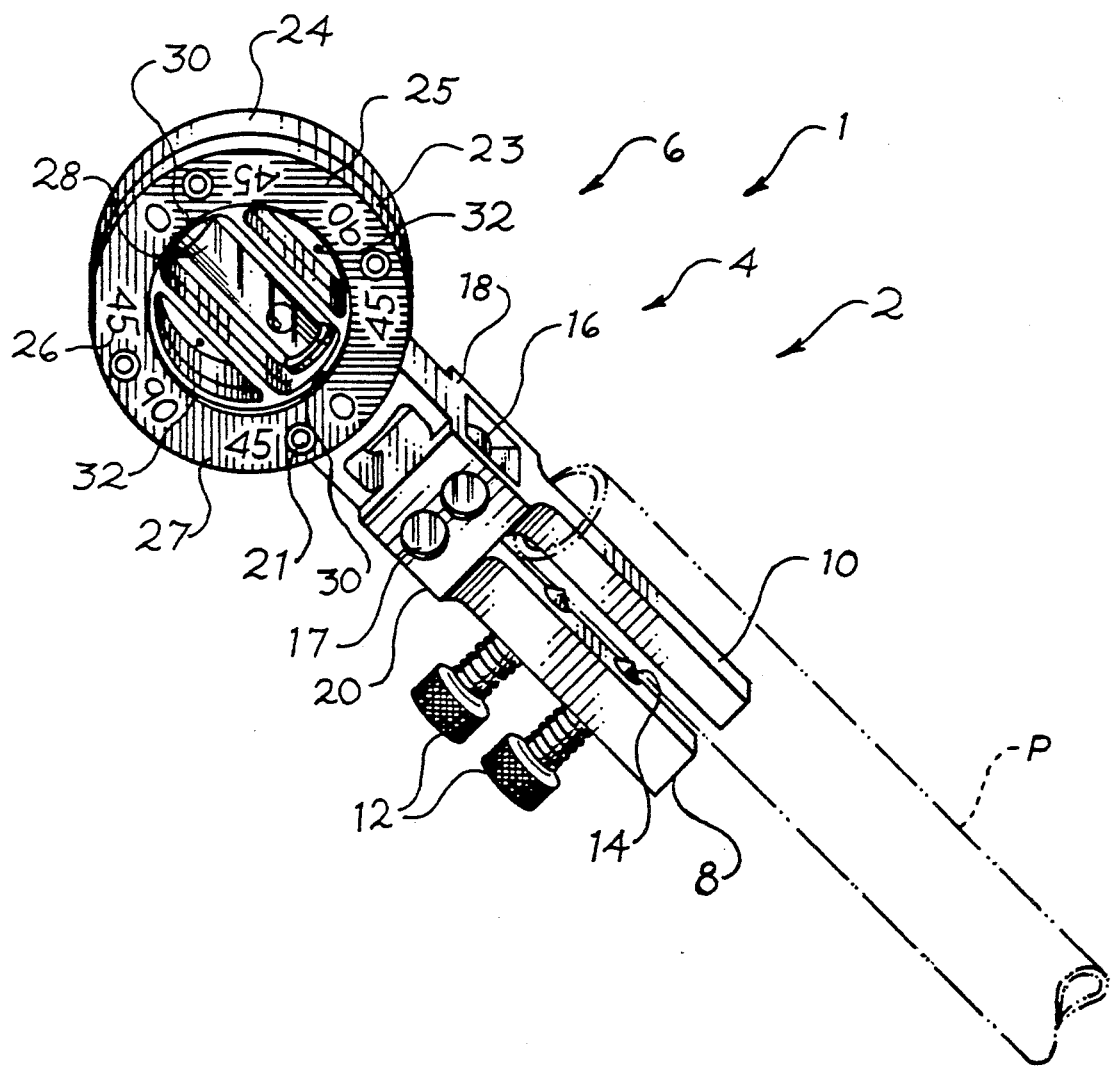
FIG. 5 is a perspective view of a second preferred embodiment in which the anti-dog section is fixed to the mounting section.

Another preferred embodiment is depicted in FIG. 5. It differs from the previously disclosed embodiment having the anti-dog section 4 rigidly fixed to the mounting section 2. All other elements of this embodiment and its operation are the same as that previously described.

Figure 7:
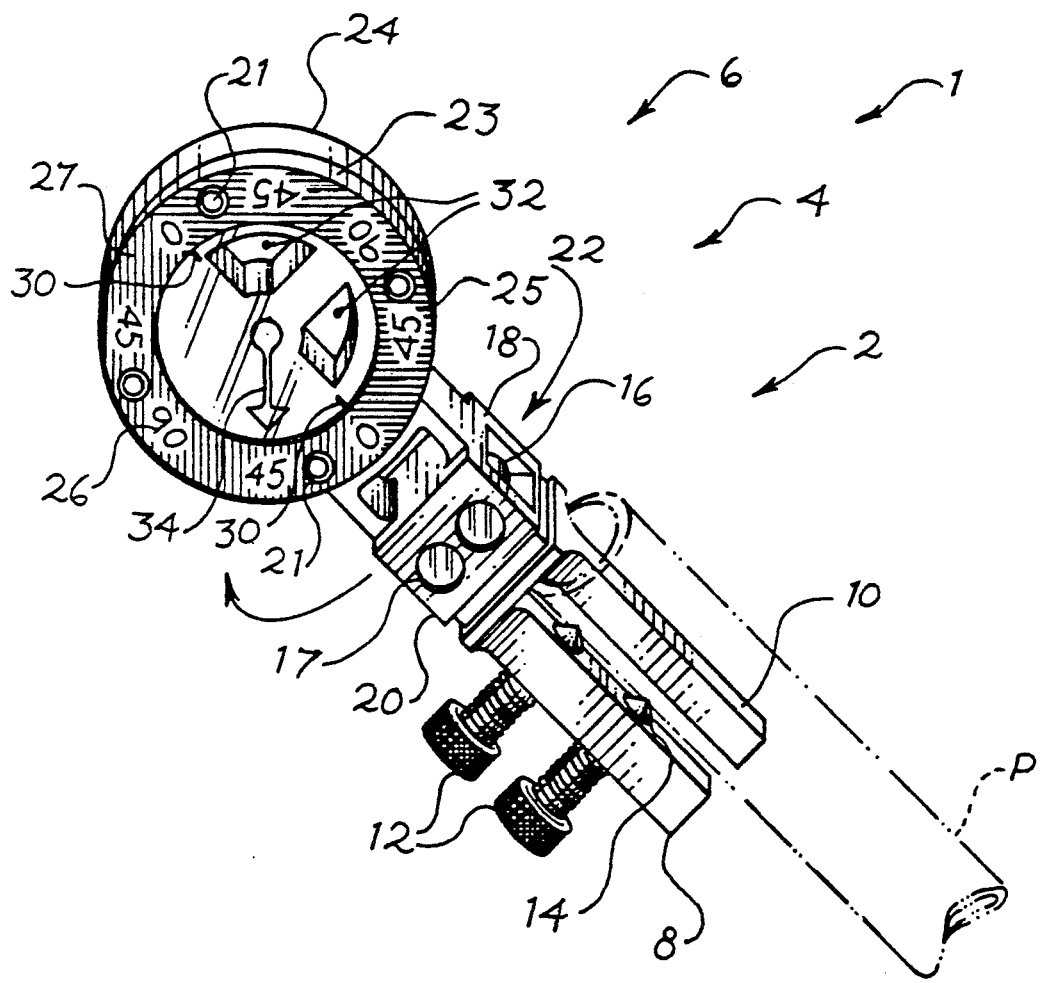
FIG. 7 is a perspective view of a third embodiment which uses a pendulum clinometer rather than a bubble level to indicate the angle of bend.

A still further alternative embodiment is seen in FIG. 7. This embodiment uses a pendulum clinometer 34 rather than an angle bubble level 28 to indicate the angle of the bend. Other than this substitution, all other elements of this embodiment and its operation are the same as that previously described with respect to the embodiment depicted in FIG. 1.

The operation of the device shown in FIG. 1 is depicted in FIGS. 2 and 3. FIG. 2 illustrates the operation of the angle measurement feature of the device. FIG. 2A shows the device mounted to a piece of conduit P which is not level. In the example shown, the conduit P is to be bent 90°. FIG. 2B illustrates the angle indicating section 6 which has the angle bubble level 28 being rotated into a level position to compensate for the tilt T of the conduit P. At this point the degree of tilt, T, as indicated by the indicating arrow 30, is noted. By subtracting T from the desired angle of bend, 90°, the angular measure to which the angle bubble level 28 must be rotated is found. As seen in FIG. 2C, the angle bubble level 28 had been rotated to this position. In FIG. 2D, the conduit P is bent until the second bubble level 28 is level. At this point, the desired angle of bend, 90°, is attained. Thus, the device easily indicates when conduit is bent to a desired angle without first leveling the conduit.

FIG. 3 depicts the steps undertaken to prevent a dog from forming in the conduit as it is bent to the desired angle. In FIG. 3A, the device has been attached to a piece of conduit P so that the device is not precisely level about its horizontal-orthogonal axis as indicated by the appearance of the bubble 15 in the anti-dog bubble level 16. FIG. 3B shows that the anti-dog section 4 is leveled by rotating it relative to the mounting section 2 until the first anti-dog bubble level 16 shows level. At this point, the first bend of an offset is made. FIG. 3C shows the conduit after the first bend has been made and after it has been turned 180° and is ready to have the second bend made to complete the offset. At this point, as the second bend is formed the operator can observe the second anti-dog bubble level 17 to insure the second bend is in the same plane as the first bend to prevent a dog-leg from forming in the bend. Of course, the alternative embodiment in which the anti-dog section 4 is fixed to the mounting section 2, operates by first adjusting the conduit P in the bender to position the first anti-dog bubble level 16 to level. Once this is achieved, the operator uses the anti-dog bubble levels in the same manner as the other embodiments, i.e. the operator observes them to prevent a dog-leg from forming.

It will be understood that the foregoing relates only to various embodiments of the present invention. Numerous changes and modifications may be made therein without departing from the spirit and scope of the invention as described in the following claims and equivalents thereof.

I claim:

1. A device for indicating the bending plane and the angle of a bend of a piece of conduit comprising:
    a mounting section having means for attaching the device to a piece of conduit so that a longitudinal axis of the device corresponds to a longitudinal axis of the conduit;
    an anti-dog section having plane indicating means which indicate that a bend in the conduit is essentially coplanar with the longitudinal axis of the conduit;
    means for attaching the anti-dog section to the mounting section for rotation about the longitudinal axis of the conduit permitting the anti-dog section to be set to a horizontally level position without having to first level the conduit along its longitudinal axis;
    an angle indicating section having angle indicating means which indicate the angle of a bend in the conduit; and
    means for attaching the angle indicating section to the anti-dog section and permitting rotation about the horizontal orthogonal axis of the conduit to allow the angle indicating section to be set to a level position without having to first level the conduit along the longitudinal axis of the conduit.

2. The device of claim 1 wherein a mounting section comprises an attaching fork for clamping the device to conduit.

3. The device of claim 2 wherein the attaching fork comprises a front tine, a rear tine, and fastening means for retaining a wall of conduit between the front tine and the rear tine.

4. The device of claim 3 wherein said fastening means comprises at least one thumb screw and at least one threaded hole for receiving the thumb screw through the front tine so that a wall of the conduit may be clamped between the thumb screw and the rear tine.

5. The device of claim 1 wherein the plane indicating means comprises a first bubble level assembly mounted horizontal and orthogonal to the longitudinal axis of the device.

6. The device of claim 1 wherein the angle indicating means comprises a second bubble level assembly mounted along the longitudinal axis of the device.

7. The device of claim 1 wherein the angle indicating means comprises a pendulum clinometer.

8. The device of claim 1 wherein the means for attaching the angle indicating section to the anti-dog section comprises ratchet means providing for the incremental rotation of the angle indicating section about the orthogonal horizontal axis of the device relative to the anti-dog section.

9. The device of claim 1 wherein the anti-dog section further has a mounting band to which the angle indicating means is mounted.

10. The device of claim 9 wherein the mounting band has raised angular measurement markings permitting easy recognition of the angular measurements.

11. The device of claim 1 wherein the means for attaching the anti-dog section to the mounting section comprises ratchet means providing for the incremental rotation of the anti-dog section about the longitudinal axis of the device.

12. The device of claim 1 wherein the angle indicating section employs color coded angle markings to indicate the direction a bend should be made to complete an offset.

13. The device of claim 1 wherein the angle indicating section has finger holes to permit grasping the angle indicating section and rotating it to the horizontally level position.

14. A device for indicating the bending plane and the angle of a bend of a piece of conduit comprising:
    a mounting section having means for attaching the device to a piece of conduit so that a longitudinal axis of the device corresponds to a longitudinal axis of the conduit;
    an anti-dog section attached to the mounting section and having plane indicating means which indicate that a bend in the conduit is essentially coplanar with the longitudinal axis of the conduit;
    an angle indicating section having angle indicating means which indicate the angle of a bend in the conduit; and
    means for attaching the angle indicating section to the anti-dog section and permitting rotation about a horizontal orthogonal axis of the conduit to allow the angle indicating section to be set to level position without having to first level the conduit along the longitudinal axis of the conduit.

15. The device of claim 14 wherein a mounting section comprises an attaching fork for clamping the device to conduit.

16. The device of claim 15 wherein the attaching fork comprises a front tine, a rear tine, and fastening means for retaining a wall of the conduit between the front tine and the rear tine.

17. The device of claim 16 wherein said fastening means comprises at least one thumb screw and at least one threaded hole for receiving the thumb screw through the front tine so that a wall of the conduit may be clamped between the thumb screw and the rear tine.

18. The device of claim 14 wherein the plane indicating means comprises a first bubble level assembly mounted horizontal and orthogonal to the longitudinal axis of the device.

19. The device of claim 14 wherein the angle indicating means comprises a second bubble level assembly mounted along the longitudinal axis of the device.

20. The device of claim 14 wherein the angle indicating means comprises a pendulum clinometer.

21. The device of claim 14 wherein the means for attaching the angle indicating section to the anti-dog section comprises ratchet means providing for the incremental rotation of the angle indicating section about the orthogonal horizontal axis of the device relative to the anti-dog section.

22. The device of claim 14 wherein the anti-dog section further has a mounting band to which the angle indicating means is mounted.

23. The device of claim 22 wherein the mounting band has raised angular measurement markings permitting easy recognition of the angular measurements.

24. The device of claim 14 wherein the angle indicating section employs color coded angle markings to indicate the direction a bend should be made to complete an offset.

25. The device of claim 14 wherein the angle indicating section has finger holes to permit grasping the angle indicating section and rotating it to the horizontally level position.

* * * * *